US011880897B2

(12) United States Patent
Frommelt et al.

(10) Patent No.: US 11,880,897 B2
(45) Date of Patent: Jan. 23, 2024

(54) DEVICE, SYSTEM, AND METHOD FOR SHARING INFORMATION OF A SELECTED MEDIA MODALITY VIA COMMUNICATION DEVICES

(71) Applicant: MOTOROLA SOLUTIONS, INC., Chicago, IL (US)

(72) Inventors: Brian J. Frommelt, Chicago, IL (US); Nadeem Z. Kureishy, Chicago, IL (US); Kylene Tanner, Chicago, IL (US); Francesca Schuler, Chicago, IL (US); Vidya Sagar Pitta Eswara Chandra, Chicago, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 285 days.

(21) Appl. No.: 17/497,454

(22) Filed: Oct. 8, 2021

(65) Prior Publication Data

US 2023/0113190 A1 Apr. 13, 2023

(51) Int. Cl.
*G06Q 50/26* (2012.01)
*H04L 51/10* (2022.01)
*G06F 3/0482* (2013.01)

(52) U.S. Cl.
CPC ......... *G06Q 50/265* (2013.01); *G06F 3/0482* (2013.01); *H04L 51/10* (2013.01)

(58) Field of Classification Search
CPC ...... G06Q 50/265; G06F 3/0482; H04L 51/10
See application file for complete search history.

(56) References Cited

U.S. PATENT DOCUMENTS

| | | | |
|---|---|---|---|
| 7,711,749 B2* | 5/2010 | Brodie | G06F 16/367 707/783 |
| 7,805,415 B1 | 9/2010 | Flesher et al. | |
| 7,874,005 B2 | 1/2011 | Picolli | |
| 8,934,015 B1* | 1/2015 | Chi | G06F 16/955 348/158 |
| 2015/0149560 A1* | 5/2015 | Lee | H04L 51/066 709/206 |
| 2019/0188814 A1* | 6/2019 | Kreitzer | G06F 21/6254 |
| 2021/0117567 A1 | 4/2021 | Braghin et al. | |
| 2021/0150654 A1* | 5/2021 | Moradzadeh | H04W 4/80 |
| 2022/0397686 A1* | 12/2022 | Scacchi | G01S 19/485 |

OTHER PUBLICATIONS https://www.callyo.com/public-safety/10-21-police-phone—retrieved Oct. 7, 2021.

* cited by examiner

*Primary Examiner* — Dino Kujundzic
(74) *Attorney, Agent, or Firm* — PERRY + CURRIER, INC.

(57) ABSTRACT

A device, system, and method for sharing information of a selected media modality via communication devices is provided. A device determines a type of a community member associated with an incident, the incident further associated with a first responder. The device determines a plurality of media modalities of information associated with the incident. The device selects, from the plurality of media modalities of the information, a media modality of the information based on the type of the community member. The device causes sharing of the media modality of the information with the community member via one or more of a first responder communication device, associated with the first responder, and a community member communication device, associated with the community member.

20 Claims, 6 Drawing Sheets

DEVICE, SYSTEM, AND METHOD FOR SHARING INFORMATION OF A SELECTED MEDIA MODALITY VIA COMMUNICATION DEVICES

BACKGROUND OF THE INVENTION

Personally Identifiable Information (PII) is generally collected, viewed, stored, retrieved and shared throughout the course of an incident (e.g. a public safety incident), for example by first responders. Sometimes, when investigating an incident, a first responder may electronically share information regarding the incident with a community member (e.g. a victim, a witness, etc.).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
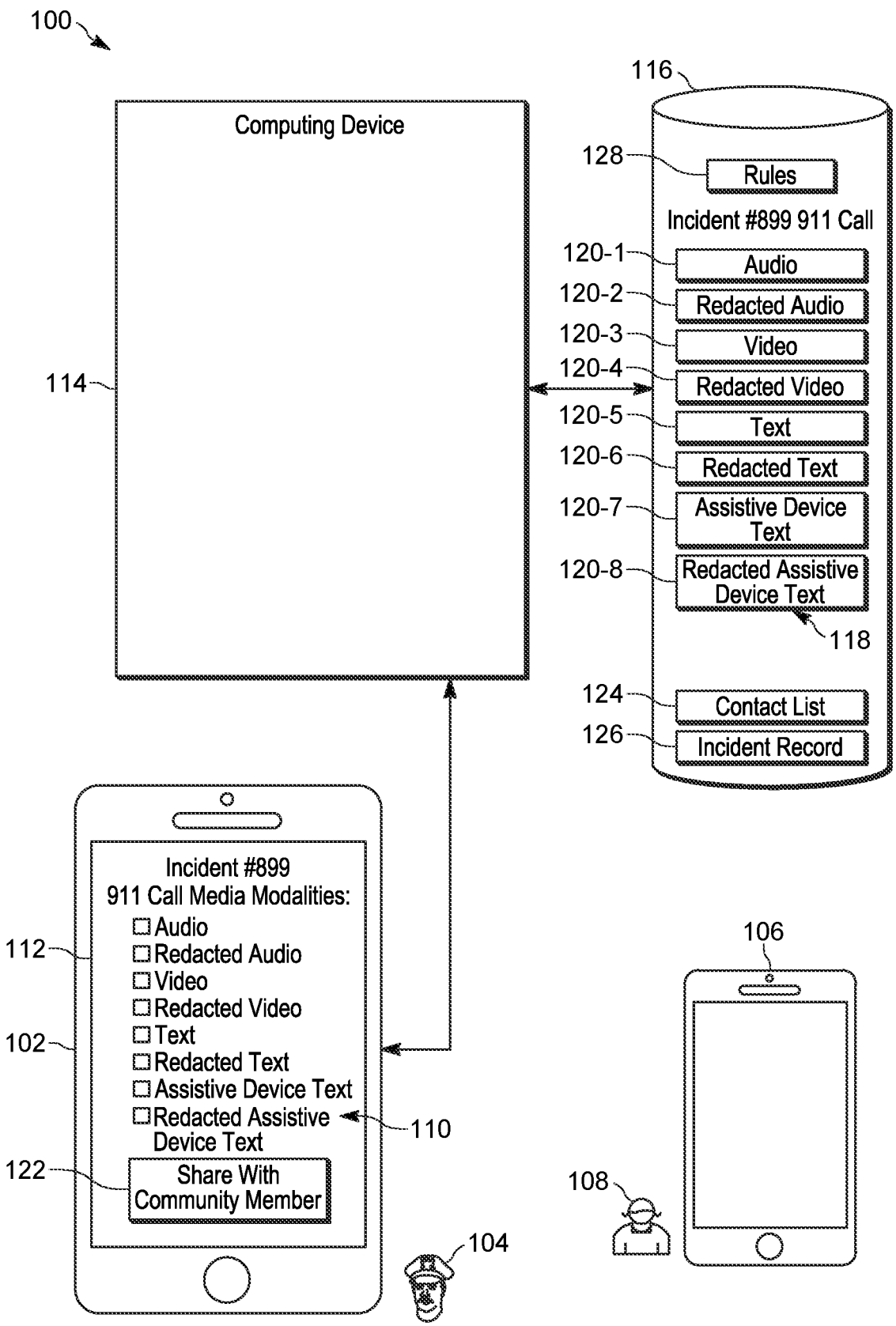
FIG. 1 is a system for sharing information of a selected media modality via communication devices, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Personally Identifiable Information (PII) is generally collected, viewed, stored, retrieved and shared throughout the course of an incident (e.g. a public safety incident), for example by first responders. Sometimes, when investigating an incident, a first responder may electronically share information regarding the incident with a community member (e.g. a victim, a witness, etc.); however, it is generally important to restrict electronic sharing of PII. Thus, there exists a need for an improved technical method, device, and system for sharing information of a selected media modality via communication devices.

Hence, provided herein is a device, system, and method for sharing information of a selected media modality via communication devices. In particular, a communication device being operated by a first responder may be implementing an application, such as an incident management application, in conjunction with a computing device (e.g. in the cloud) via a network communication link therebetween. The first responder may operate the communication device to initiate electronic sharing of information associated with an incident with a community member, for example while investigating the incident. The computing device may generally determine a type of the community member with which information is to be electronic shared, and further determine a plurality of media modalities of the information that may be available to electronically share with the community member.

Types of community members with which the information may be electronically shared may include, but are not limited to, a caller who reported the incident, a victim of the incident, a suspect in the incident, a witness to the incident (who may, or may not be, associated with the caller and/or the victim and/or the suspect) an on-line tipster who reported a tip about the incident, and the like.

Using an example of audio of a recorded video call of a caller that reported the incident, media modalities as described herein may include, but are not limited to, audio of the call, redacted audio of the call (e.g. which may have PII of the caller, or other persons mentioned on the call, redacted), video of the call, redacted video of the call, text of the call, redacted text of the call, assistive device text of the call (e.g. a machine based reading of text of the call), redacted assistive text of the call, and the like. However, available media modalities may depend on a type of information to be electronically shared; for example, when the information is originally audio, and there is no video, the media modalities may exclude video and redacted video.

Having determined the type of the community member with which information is to be electronically shared, and having further determined the plurality of media modalities of the information that are available to be electronically shared, the computing device may select a media modality of the information, based on the type of the community member, that may be electronically shared with the community member, and cause electronic sharing of the media modality of the information that is selected using a communication device of the first responder and/or a communication device of the community member.

Selection of the media modality of the information that is to be electronically shared may be performed so as to limit and/or prevent electronic sharing of PII in the information with the community member. For example, when the community member is the suspect in the incident, and the information includes PII of a caller that reported the incident, the media modality of the information may comprise the redacted audio of the call, that redacts PII of the caller and/or PII of a victim, and the like.

Furthermore electronic sharing of the media modality of the information may occur with the communication device of the community member, at least temporarily, for example in a data sharing session. However, other examples of electronic sharing are within the scope of the present specification.

An aspect of the present specification provides a method comprising: determining, at a computing device, a type of a community member associated with an incident, the incident further associated with a first responder; determining, at the computing device, a plurality of media modalities of information associated with the incident; selecting, at the computing device, from the plurality of media modalities of the information, a media modality of the information based on the type of the community member; and causing, at the computing device, sharing of the media modality of the information with the community member via one or more of a first responder communication device, associated with the first responder, and a community member communication device, associated with the community member Another aspect of the present specification provides a device comprising: a communication unit; and a controller configured to: determine a type of a community member associated with an incident, the incident further associated with a first responder; determine a plurality of media modalities of information associated with the incident; select, from the plurality of media modalities of the information, a media modality of the information based on the type of the community member; and cause, via the communication unit, sharing of the media modality of the information with the community member via one or more of a first responder communication device, associated with the first responder, and a community member communication device, associated with the community member.

Each of the above-mentioned aspects will be discussed in more detail below, starting with example system and device architectures of the system in which the embodiments may be practiced, followed by an illustration of processing blocks for achieving an improved technical method, device, and system for sharing information of a selected media modality via communication devices.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the drawings.

Attention is directed to FIG. 1, which depicts an example system 100 for sharing information of a selected media modality via communication devices. The various components of the system 100 are in communication via any suitable combination of wired and/or wireless communication links, and communication links between components of the system 100 are depicted in FIG. 1, and throughout the present specification, as double-ended arrows between respective components; the communication links may include any suitable combination of wireless and/or wired links and/or wireless and/or wired communication networks, and the like.

The system 100 comprises a first responder communication device 102 associated with a first responder 104, and a community member communication device 106 associated, for example, by a member of the community and/or the general public, and the like, referred to hereafter as a community member 108.

While examples herein are described with respect to the first responder 104 being a police officer of a police department, the first responder 104 may be any suitable first responder associated with any suitable agency, including, but not limited to, a firefighter associated with a fire department (e.g., a fire agency), an emergency medical technician (EMT) associated with an emergency medical services agency and/or hospital agency and the like.

It is understood herein that the first responder 104 and the community member 108 are both associated with an incident, as described hereafter. For example, the first responder 104 may be investigating the incident, which may comprise a public safety incident and/or a security incident, such as a police incident, a fire incident, a medical incident, and the like.

It is furthermore understood that the community member 108 is also generally associated with the incident being investigated by the first responder 104. For example, the community member 108 may comprise a caller that reported the incident, a victim of the incident, a suspect in the incident, a witness to the incident (who may, or may not be, associated with a caller, a victim and/or a suspect), a tipster (e.g. a tipster who provided a tip via an on-line tip portal, and/or who called in a tip using a tip-line/phone number), and the like.

Furthermore, while the first responder communication device 102 is depicted as a mobile device, the first responder communication device 102 may be in any suitable format including, but not limited to, a vehicle communication device, a laptop computer, a fixed location communication device (e.g., a desktop phone), and the like. Similarly, while the community member communication device 106 is depicted as a mobile device, the community member communication device 106 may be in any suitable format which may be the same as, or different from, the format of the first responder communication device 102.

In general, it is understood that both the first responder 104 may be operating the first responder communication device 102 to assist with investigating the incident, for example by implementing an incident application 110 which may be used to retrieve and/or view information associated with incidents, as described herein. For example, as depicted, the first responder communication device 102 is showing, at a display screen 112 a list of available media modalities for a 911 call that occurred in conjunction with an incident, and that was assigned an incident number of "899". Such media modalities are described in more detail below. Furthermore, the incident number is understood to have been assigned to the incident in any suitable manner, for example by a public-safety answering point (PSAP) that received the 911 call.

As depicted, the system 100 further comprises a computing device 114 in communication with the first responder communication device 102. Initially, as depicted, the community member communication device 106 may not be in communication with the first responder communication device 102 and the computing device 114; however it is understood that the communication devices 102, 106 and/or the computing device 114 are generally configured to establish such communication as described herein.

The computing device 114 may comprise an application server, and the like, and/or any other suitable combination of one or more computing devices and/or one or more servers and/or one or more cloud computing devices which may assist the first responder communication device 102 with implementing the incident application 110 via a communication link therebetween. In particular, the computing device 114 may generate information to be rendered at the display screen 112 in conjunction with the first responder communication device 102 implementing the incident application 110, for example in browser-type environment (e.g. the incident application 110 may be implemented in a browser-type environment at the first responder communication device 102 and request information from the computing device 114, which provides the information to the first responder communication device 102).

For example, as depicted, the computing device 114 has access to a memory 116 (e.g., as depicted in the form of a database, and which may comprise one or more memories) which stores information related to the incident being investigated by the first responder 104. For example, as depicted, the information stored at the memory 116 comprises information associated with the 911 call that occurred in conjunction with the incident that was assigned the incident number of "899". For simplicity, hereafter the 911 call is referred to interchangeably as the call. It is furthermore understood that in the provided example the call was in the form of a video call. As depicted the information is in the form of a plurality of media modalities 118 that, as depicted, include, but are not limited to, audio 120-1 of the call, redacted audio 120-2 of the call, video 120-3 of the call, redacted video 120-4 of the call, text 120-5 of the call (e.g. a transcript), redacted text 120-6 of the call, assistive device text 120-7 of the call, and redacted assistive device text 120-8 of the call.

As such, the term "media modality" as used herein is understood to include different forms and/or different modes of media (e.g. audio, video, images, text and/or a combination thereof) that represents given information. Hence, for example, the different media modalities 118 are understood to each comprise a different media modality that represent same and/or similar information for the 911 call. Furthermore, given one initial media modality 118, other media modalities 118 may be generated, however types of media modalities 118 that may be generated may depend on the initial media modality; for example, audio may be generated from an initial video, but video may not be generated from initial audio.

For example, assuming that the call was a video call, and the video 120-3 comprises an initial media modality 118, it understood that the video 120-3 of the call has been processed to extract and/or generate the audio 120-1 of the call, and furthermore the audio 120-1 and/or the video 120-3 has been processed to generate the text 120-5 (e.g. a transcript) and/or the assistive device text 120-7. The assistive device text 120-7 may be the same or different as the text 120-5, but adapted to be "read" by an assistive device reader (e.g. at one or more of the communication devices 102, 106) to generate audio for a blind person; such assistive device text 120-7 may include the text 120-5 as well as descriptions of objects in the video 120-3 and/or background noises in the audio 120-1, and the like. Processing of the video 120-3 may occur by the computing device 114 and/or any other suitable device, for example using any suitable combination of video analysis algorithms, audio extraction algorithms, speech-to-text algorithms, assisted device text generation algorithms, and the like.

It is further understood that the redacted audio 120-2, the redacted video 120-4, the redacted text 120-6 and the redacted assistive device text 120-8 may be generated using any suitable combination of redaction algorithms, including, but not limited to, machine learning algorithms trained to redact certain information from audio and/or video and/or text and/or assisted device text; for example, the redacted audio 120-2, the redacted video 120-4, the redacted text 120-6 and the redacted assistive device text 120-8 may have PII redacted therefrom, for example to remove PII of the caller that made the 911 call. Such PII may include, but is not limited to, a voice of the caller, an image of the caller, a name of the caller, an address of the caller, a phone number of the caller, and the like. In particular, when a voice of the caller is redacted from the audio 120-1 and/or the video 120-3, the voice of the caller may be changed to another voice (e.g. a "machine" voice, and/or raised or lowered to a pitch different from an original pitch) in the redacted audio 120-2 and/or the redacted video 120-4. Similarly, when an image of the caller is redacted from the video 120-3, the image of the caller may be blurred out and/or covered by an image (e.g. a black circle, and the like) in the redacted video 120-4.

Hence, in general, the redacted audio 120-2, the redacted video 120-4, the redacted text 120-6 and the redacted assistive device text 120-8 has information removed therefrom that may allow the community member 108 to identify the caller that made the 911 call.

However, other types of information may be redacted. For example, the redacted video 120-4 may have objects in the background blurred out and/or covered to prevent the community member 108 from identifying a location from which the call originated. Similarly, the redacted video 120-4 may have persons other than the caller blurred out and/or covered to prevent the community member 108 from identifying such persons.

Indeed, any suitable type of redaction is within the scope of the present specification. For example, names, addresses, phone numbers and the like of persons mentioned on the call may be redacted in the redacted audio 120-2, the redacted video 120-4, the redacted text 120-6 and the redacted assistive device text 120-8.

Hence, in particular, redactions of PII in one or more of the media modalities 118 may occur, and that types of redactions may depend on a type of a media modality 118 in which PII is being redacted.

While eight types of media modalities 118 are depicted, it is understood that fewer than eight types of media modalities 118 may be provided (e.g. audio and redacted audio only), or more than eight types of media modalities 118 may be provided (e.g. the depicted eight types as well as images and/or redacted images extracted from video). Furthermore, the available media modalities 118 may be provided in any suitable combination.

Furthermore, while all the media modalities 118 are depicted as being initially stored at the memory 116, some of the media modalities 118 may not be initially stored at the memory 116 but generated upon demand. For example, the audio 120-1 and video 120-3 may be initially stored, but the other media modalities 118 may not be initially present at the memory 116, but generated by the computing device 114 (and/or any other suitable computing device) upon request by the first responder communication device 102, for example when the first responder 104 operated the first responder communication device 102 to request a particular media modality 118.

For example, as depicted, the first responder communication device 102, during implementation of the incident application 110, is providing at the display screen 112 a list available media modalities 118 of the 911 call for the incident. The first responder 104 may select a media modality 118 for viewing for example by using selection boxes adjacent items in the list that correspond to a particular media modality 118, and/or by touching an item in the list, assuming that the display screen 112 includes a touch screen, and/or by using a menu system, and the like. The first responder communication device 102 may request a selected media modality 118 from the computing device 114, which may retrieve the selected media modality 118 from the memory 116 and/or generate the selected media modality 118 using one of the stored media modalities 118.

As depicted, however, the first responder communication device 102, during implementation of the incident application 110, is further providing an electronic button 122 which, when actuated, may cause one or more of the media modalities 118 to be electronically shared with a community member (e.g. the community member 108) using one or more of the communication devices 102, 106. Hereafter, the terms "share", "shared", "sharing", and the like, as used with reference to sharing a media modality 118 with a community member, are understood to comprise electronic sharing of a media modality 118 using one or more of the communication devices 102, 106.

In some examples, a community member with which a media modality 118 is to be shared may be determined via a data entry field at the display screen 112. For example, the first responder 104 may operate the first responder communication device 102 to enter a name of the community member 108 and/or a phone number of the community member communication device 106 and/or an email address of the community member 108, and the like.

In other examples, a community member with which a media modality 118 is to be shared may be selected using a contact list 124 and/or an incident record 126 associated with the incident which, as depicted, are stored at the memory 116, however the contact list 124 and/or the incident record 126 may alternatively be stored, or at least partially stored, at the first responder communication device 102. For example, the first responder 104 may operate the first responder communication device 102 to access the contact list 124, which may store contact records of community members, and a contact record for the community member 108 may be selected from the contact list 124 (and which may include, but is not limited to, or a phone number of the community member communication device 106 and/or an email address of the community member 108, and the like).

In yet further examples, a community member with which a media modality 118 is to be shared may be selected using the incident record 126 for the incident. For example, the first responder 104 may operate the first responder communication device 102 to request the incident record 126 from the computing device 114, which may provide the incident record 126 to the first responder communication device 102, and the community member 108 may be selected from the incident record 126. In these examples, it is understood that the incident record 126 may have been prepopulated with a phone number of the community member communication device 106 and/or an email address of the community member 108, and the like.

In examples where a community member is selected via the contact list 124 and/or the incident record 126, a type of the selected community member may have been prepopulated at the contact list 124 and/or the incident record 126. As such, in these examples, a determination of a type of a community member with which a media modality 118 is to be shared may occur using one or more the contact list 124 and the incident record 126.

Figure 4:
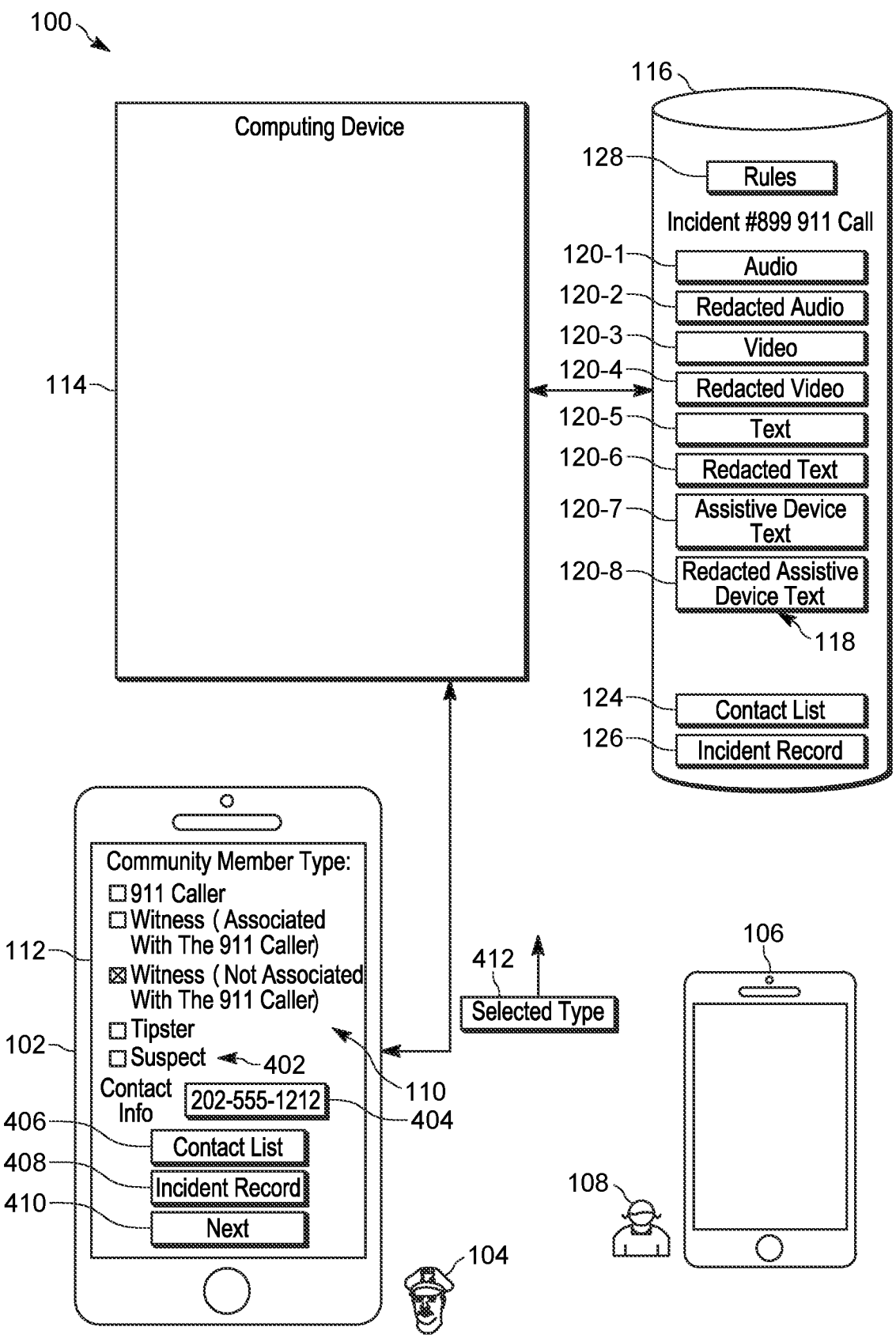
FIG. 4 depicts the system of FIG. 1 implementing a method for sharing information of a selected media modality via communication devices, according to some examples.

Alternatively, for example, as described in more detail with respect to FIG. 4, the first responder communication device 102, responsive to the electronic button 122 being actuated, may provide a list of community member types, such as a caller, a witness, a tipster, a suspect, and the like, and the first responder 104 may select the type of community member with which a media modality 118 is to be shared. The computing device 114 may receive the selection and filter the available media modalities 118 that may be shared with the selected type of community member, and send an updated list of available media modalities 118 to the first responder communication device 102. For example, when a community member with which a media modality 118 is to be shared is a witness who is not associated with the caller that made the 911 call, the available media modalities 118 that may be shared may include only the redacted audio 120-2, the redacted text 120-6 and/or the redacted assistive device text 120-8. Such sharing is described in more detail below with respect to FIG. 5 and FIG. 6.

In some examples, as depicted, selecting a media modality 118 of information, based on a type of a community member, may be based on rules 128 to limit sharing of PII in the information to the community member. For example, the rules 128 may define that when a community member type comprises a witness who is not associated with a caller that made a 911 call, the available media modalities 118 that may be shared may include only redacted media modalities (e.g. the redacted audio 120-2, the redacted video 120-4, the redacted text 120-6 and/or the redacted assistive device text 120-8).

Furthermore, types of redactions that may occur may depend on a type of a community member. For example, while only one type of each of the redacted audio 120-2, the redacted video 120-4, the redacted text 120-6, and the redacted assistive device text 120-8 is depicted, redactions that may occur may depend on a selected type of a community member, and such redactions may also be defined by the rules 128. For example, when a community member type comprises a witness who is not associated with a caller that made a 911 call, all the PII of the caller may be redacted from the redacted audio 120-2, the redacted video 120-4, the redacted text 120-6, and the redacted assistive device text 120-8, but PII of another witness (e.g. a name) mentioned by the caller may not be redacted. However, when a community member type comprises a witness who is associated with a caller that made a 911 call, only a portion of the PII of the caller may be redacted from the redacted audio 120-2, the redacted video 120-4, the redacted text 120-6, and the redacted assistive device text 120-8 but PII of another witness (e.g. a name) mentioned by the caller may be redacted; for example, an image and/voice of the caller may not be redacted, but their phone number and address may be redacted. Such redactions and/or generation of the redacted audio 120-2, the redacted video 120-4, the redacted text 120-6, and the redacted assistive device text 120-8 may hence occur upon selection of a type of a community member with which a media modality 118 is to be shared.

Indeed, such an example further illustrates that types of PII that are redacted may differ, depending on a type of community member that is selected. For example, again using the example of a 911 call, PII of the caller may be redacted, but PII of others mentioned by the caller (such as another witness, a suspect, etc.) may be redacted or not redacted. Such types of redactions may be defined by the rules 128.

When a media modality 118 is selected for sharing with a community member, such as the community member 108, the selected media modality 118 may be shared via one or more of the first responder communication device 102 and a community member communication device, such as the community member communication device 106. For example, the selected media modality 118 may be transmitted to the community member communication device 106 and/or a link to the selected media modality 118, as stored at memory 116, may be transmitted to the community member communication device 106. In some examples, such sharing may be temporary such that the selected media modality 118 may be transmitted with an application for playing the selected media modality 118 and which deletes the selected media modality 118 after a given period of time (e.g. 10 minutes, 1 hour, 2 hours, and/or any other suitable time period). Similarly, the link to the selected media modality 118 may be valid only for a given period of time (e.g. 10 minutes, 1 hour, 2 hours, and/or any other suitable time period). Such time periods may be fixed, and/or such time periods may also be defined by the rules 128 and may depend on a type of community member with a media modality 118 is being shared. For example, sharing of a media modality 118 with a witness may occur for a longer time period than sharing of a media modality with a suspect. Alternatively, such time periods may be selected via the incident application 110.

Alternatively, a data sharing session between the first responder communication device 102 and the community member communication device 106 in which the selected media modality 118 is played at the community member communication device 106 under control of the first responder communication device 102; in such an example both the communication devices 102, 106 may comprise data sharing session applications installed therein, and/or which may be accessed via browser applications, that may communicate via internet communication links, telephone communication links, near-field communications protocols and the like. Alternatively, the selected media modality 118 may be played at the first responder communication device 102 (e.g. at the display screen 112 and/or via a speaker thereof) for viewing and/or listening by the community member 108.

Figure 2:
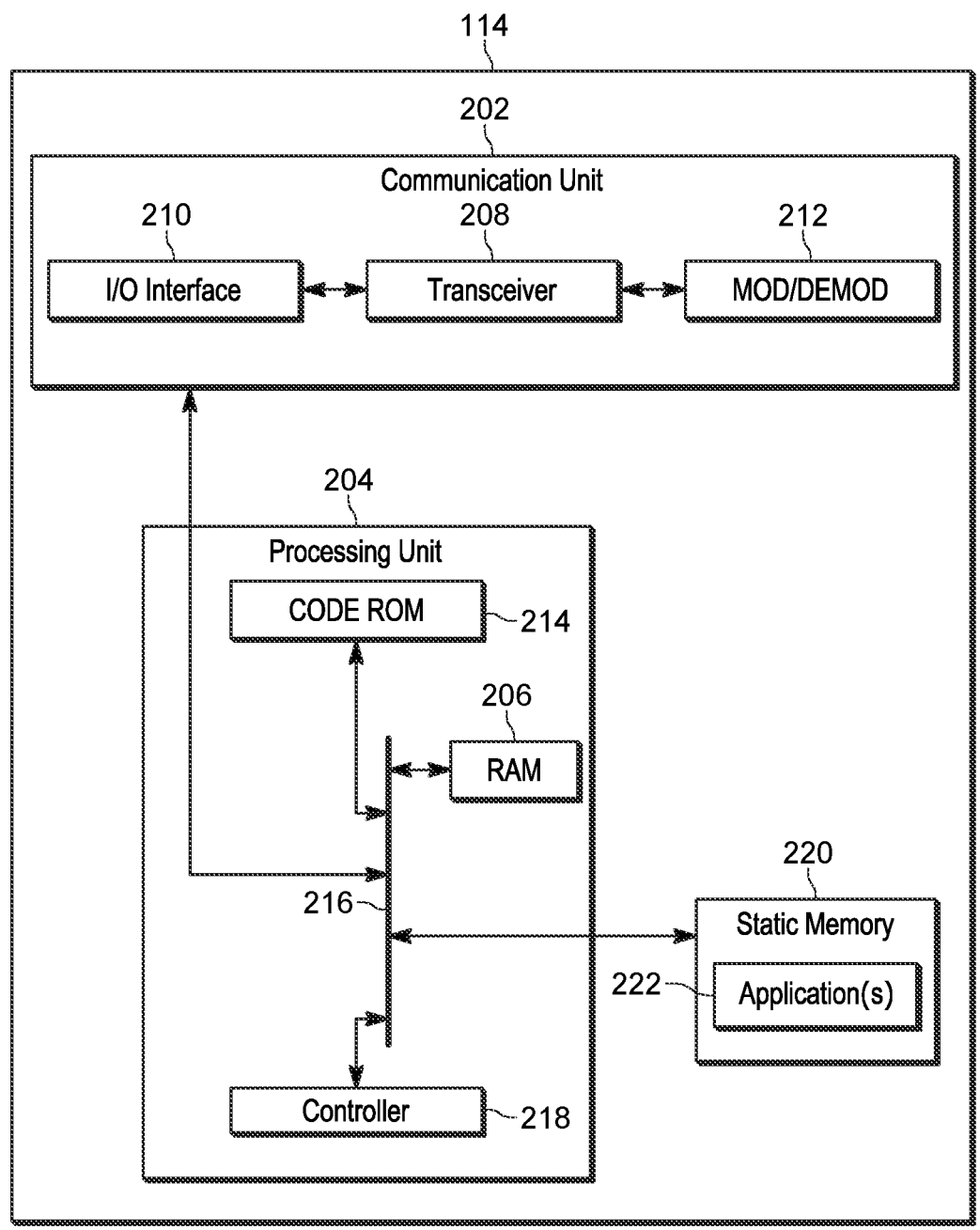
FIG. 2 is a device diagram showing a device structure of communication device for sharing information of a selected media modality via communication devices, in accordance with some examples.

Attention is next directed to FIG. 2, which depicts a schematic block diagram of an example of the computing device 114. While the computing device 114 is depicted in FIG. 2 as a single component, functionality of the computing device 114 may be distributed among a plurality of components; for example, a portion of the functionality of the computing device 114 may be implemented at the first responder communication device 102. Furthermore, the computing device 114 may comprise any suitable combination of one or more computing devices and/or one or more servers and/or one or more cloud computing devices, and the like.

As depicted, the computing device 114 comprises: a communication unit 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. The controller 218 is understood to be communicatively connected to other components of the computing device 114 via the common data and address bus 216. Hereafter, the at least one application 222 will be interchangeably referred to as the application 222.

Furthermore, while the memories 206, 214 are depicted as having a particular structure and/or configuration, (e.g., separate RAM 206 and ROM 214), memory of the computing device 114 may have any suitable structure and/or configuration.

While not depicted, the computing device 114 may include one or more of an input device, a display screen, and the like, which, when present, are also understood to be communicatively coupled to the communication unit.

As shown in FIG. 2, the computing device 114 includes the communication unit 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication unit 202 may include one or more wired and/or wireless input/output (I/O) interfaces 210 that are configurable to communicate with other components of the system 100. For example, the communication unit 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25)

network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP (3rd Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

The communication unit 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 114 is not a generic controller and/or a generic device, but a device specifically configured to implement functionality for sharing information of a selected media modality via communication devices. For example, in some examples, the computing device 114 and/or the controller 218 specifically comprises a computer executable engine configured to implement functionality for sharing information of a selected media modality via communication devices.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 114 as described herein are maintained, persistently, at the memory 220 and used by the controller 218, which makes appropriate utilization of volatile storage during the execution of such programming instructions.

Figure 3:
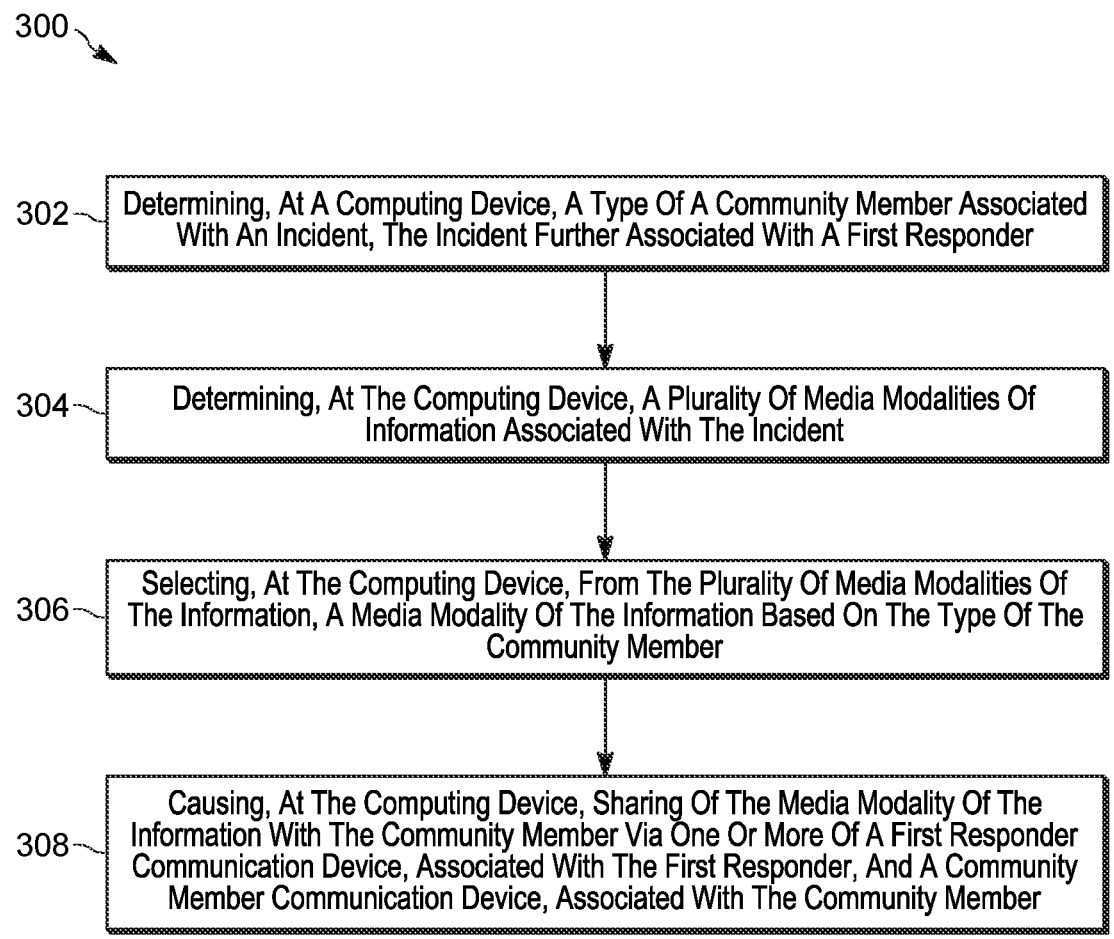
FIG. 3 is a flowchart of a method for sharing information of a selected media modality via communication devices, in accordance with some examples.

Furthermore, the memory 220 stores instructions corresponding to the at least one application 222 that, when executed by the controller 218, enables the controller 218 to implement functionality for sharing information of a selected media modality via communication devices, including but not limited to, the blocks of the method set forth in FIG. 3.

In illustrated examples, when the controller 218 executes the one or more applications 222, the controller 218 is enabled to: determine a type of a community member associated with an incident, the incident further associated with a first responder; determine a plurality of media modalities of information associated with the incident; select, from the plurality of media modalities of the information, a media modality of the information based on the type of the community member; and cause sharing of the media modality of the information with the community member via one or more of a first responder communication device, associated with the first responder, and a community member communication device, associated with the community member.

Furthermore, the application 222 may include programmatic algorithms, and the like, to implement functionality as described herein.

Alternatively, and/or in addition to programmatic algorithms, the application 222 may include one or more machine learning algorithms to implement functionality as described herein. The one or more machine learning algorithms of the application 222 may include, but are not limited to: a deep-learning based algorithm; a neural network (e.g., a convolutional neural network); a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. Any suitable machine learning algorithm and/or deep learning algorithm and/or neural network is within the scope of present examples.

Indeed, the rules 128 may include machine learning classifiers and/or convolutional neural network layers that may be used to implement functionality described herein.

Furthermore, the computing device 114 may be operated in a learning mode to provide feedback to the one or more machine learning algorithms to better "teach" the one or more machine learning algorithms to provide functionality as described herein. For example, in the learning mode, an administrator of the system 100 and/or the first responder 104, and the like, may provide feedback indicative whether a previous selection of a community member type by a machine learning algorithm was accurate or not accurate. Alternatively, data indicative of such a selection may be provided, by the computing device 114 (e.g. such data including the available media modalities 120, a selection thereof, and/or any other suitable data) to a machine learning feedback engine which may generate feedback that may be used to teach the one or more machine learning algorithms to implement the functionality provided herein. Hence, providing feedback to the one or more machine learning engines of the application 222 may occur automatically.

Furthermore, in examples where machine learning algorithms are used to make redactions that depend on a type of a community member, in the learning mode and/or the machine learning feedback mode, feedback may be provided to better "teach" the one or more machine learning algorithms thereof to redact PII, and the like, from audio, video, text, assistive device text, and the like.

Hence, the computing device 114 and/or the one or more machine learning engines of the application 222 may be operated in a machine learning feedback loop mode to provide feedback to the one or more machine learning algorithms, in a machine learning feedback loop, to indicate whether a current selection of a community member type by a machine learning algorithm and/or a make redactions that depend on a type of a community member was accurate or not accurate. For example labelled current selection of a community member type and/or a labelled redacted media modality, and/or redacted information, may be provided to the one or more machine learning algorithms, the labelling indicating whether the current selection of a community member type, and/or redactions of the media modality and/or the information, by a machine learning algorithm was accurate or not accurate, for example on a scale of 0 to 100, with 0 being not accurate and 100 being most accurate. Alternatively, a binary score may be provided, such as one of "0" or "1", where "0" indicated not accurate and "1" indicates accurate. However any suitable labelling and/or scoring scheme is within the scope of the present specification. Such feedback, including the labelling, may be generated by the one or more machine learning algorithms when selecting the community member type and/or making redactions; and/or at least the labelling and/or score may be generated manually by a computing device of the system, such as the communication device 110, being operated to indicate a score of a selected community member type, and/or a score of a redacted media modality and/or a score of redacted information; and/or at least such labelling and/or such scores may be generated manually by a feedback computing device (not depicted) operating the aforementioned machine learning feedback engine configured to receive a selected community member type and/or a redacted media modality and/or redacted information, and any other suitable data (e.g. such data including the available media modalities 120 (which may include, but is not limited to, redacted media modalities 120-2, 120-4, 120-6, 120-8), a selection thereof, and/or any other suitable data) from the computing device 114, and the like, and generate a label and/or score for the selected community member type and/or a redacted media modality and/or redacted information.

Indeed, in the learning mode and/or the machine learning feedback mode, machine learning classifiers and/or convolutional neural network layers of the rules 128 may be added to, deleted and/or changed.

While details of the communication devices 102, 106 are not depicted, the communication devices 102, 106 may have components similar to the computing device 114 adapted, however, for the respective functionality thereof.

Attention is now directed to FIG. 3, which depicts a flowchart representative of a method 300 for sharing information of a selected media modality via communication devices. The operations of the method 300 of FIG. 3 correspond to machine readable instructions that are executed by the computing device 114, and specifically the controller 218 of the computing device 114. In the illustrated example, the instructions represented by the blocks of FIG. 3 are stored at the memory 220 for example, as the application 222. The method 300 of FIG. 3 is one way that the controller 218 and/or the computing device 114 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218 and/or the computing device 114 determines the type of the community member 108 associated with the incident, the incident further associated with the first responder 104.

For example, as has been previously described, type of the community member 108 may be determined via the incident application 110 and/or the contact list 124 and/or the incident record 126.

In particular, the controller 218 and/or the computing device 114 may be based on input received at the first responder communication device 102, for example via the incident application 110 such as via a selection of the type from a list, as described below with respect to FIG. 4.

In some examples, the block 302 may further include the controller 218 and/or the computing device 114 selecting the community member 108 from one or more of: the contact list 124; and the incident record 126 associated with the incident. Such a selection of the community member 108 may occur before or after, or in conjunction with, determining the type of the community member 108. Furthermore, such a selection of the community member 108 from one or more of the contact list 124 and the incident record 126 may include selection of a type of the community member 108 as the type of the community member 108 may be stored in association with a record of the community member 108 at the contact list 124 and/or the incident record 126.

At a block 304, the controller 218 and/or the computing device 114 determines the plurality of media modalities 118 of information associated with the incident.

For example, the plurality of media modalities 118 of the information may comprise two or more of: audio representing the information; redacted audio representing the information; video representing the information; redacted video representing the information; text representing the information; redacted text representing the information; assistive device text representing the information; and redacted assistive device text representing the information. Hence, at block 304 it is understood that the controller 218 and/or the computing device 114 determines that there are at least two media modalities 118 available to share with the community member 108.

Furthermore, while examples herein have been provided which describe information associated with an incident as a 911 call, such information may comprise any suitable information associated with a call for which a plurality of media modalities is available and/or which may be generated. For example, such information may include, but is not limited to, audio and/or video of the incident acquired by a microphone and/or a camera and/or a video camera, including, but not limited to, closed circuit cameras and/or body worn cameras (e.g. a body worn camera of a first responder), a communication device of a witness (e.g. that includes a camera and/or a microphone), and the like.

At a block 306, the controller 218 and/or the computing device 114 selects, from the plurality of media modalities 118 of the information, a media modality 118 of the information based on the type of the community member 108 (e.g. that was determined at the block 302).

For example, selecting the media modality 118 of the information, based on the type of the community member 108 (e.g. determined at the block 302), may be based on the rules 128 to limit sharing of personal identifiable information (PII) in the information to the community member 108.

While certain rules 128 have been described heretofore, the rules 128 may further be based on an incident type of the incident (e.g. the incident record 126 may store the incident type). For example, the rules 128 may indicate that different respective PII be redacted from audio, video, text, and the like for different incident types. For example, more PII may be redacted for incidents that are of a robbery incident type than for incidents that are of a noise complaint incident type.

In some examples, the method 300 may further comprise the controller 218 and/or the computing device 114 (e.g. via communication with the first responder communication device 102), providing, at the display screen 112 of the first responder communication device 102, a list of a subset of the plurality of media modalities 118 of the information (e.g., which are available to share with the community member 108), the subset selected based on the type of the community member 108; and selecting the media modality 118 of the information based on a selection of the media modality 118 from the list, the selection occurring via input received at the first responder communication device 102 (e.g. such as a touch screen, and the like of the display screen 112). Indeed, the rules 128 may also be to generate the list of a subset of the plurality of media modalities 118.

In some of these examples, the method 300 may further comprise the controller 218 and/or the computing device 114 providing, at the first responder communication device 102, an indication of one or more unselected media modalities 118 of the information being unavailable for sharing with the community member 108. For example, the aforementioned list of a subset of the plurality of media modalities 118 which are available to share with the community member 108 may include one or more unselected media modalities 118 which are not available for sharing with the community member 108, for example greyed out and/or with a line through to indicate they are not available to share with the community member 108.

At a block 308, the controller 218 and/or the computing device 114 causes sharing of the media modality 118 of the information with the community member 108 via one or more of the first responder communication device 102, associated with the first responder 104, and the community member communication device 106, associated with the community member 108. The causing sharing of the media modality 118 may occur via the communication unit 202.

In some examples, the sharing of the media modality 118 of the information with the community member 108 may comprise temporarily sharing the media modality 118 of the information with the community member communication device 106. Such temporary sharing may occur via a link to the media modality 118 which have time-limited access, transmitting the media modality 118 to the community member communication device 106 and which is deleted after a given time period, and the like. Indeed, the rules 128 may also define such time limits on how long the community member communication device 106 may access the media modality 118 of the information In other examples, the sharing of the media modality 118 of the information with the community member 108 may comprise establishing a data sharing session between the first responder communication device 102 and the community member communication device 106.

In yet further examples, the sharing of the media modality 118 of the information with the community member 108 may comprises providing the media modality 118 of the information at the first responder communication device 102 for viewing by the community member 108.

Figure 5:
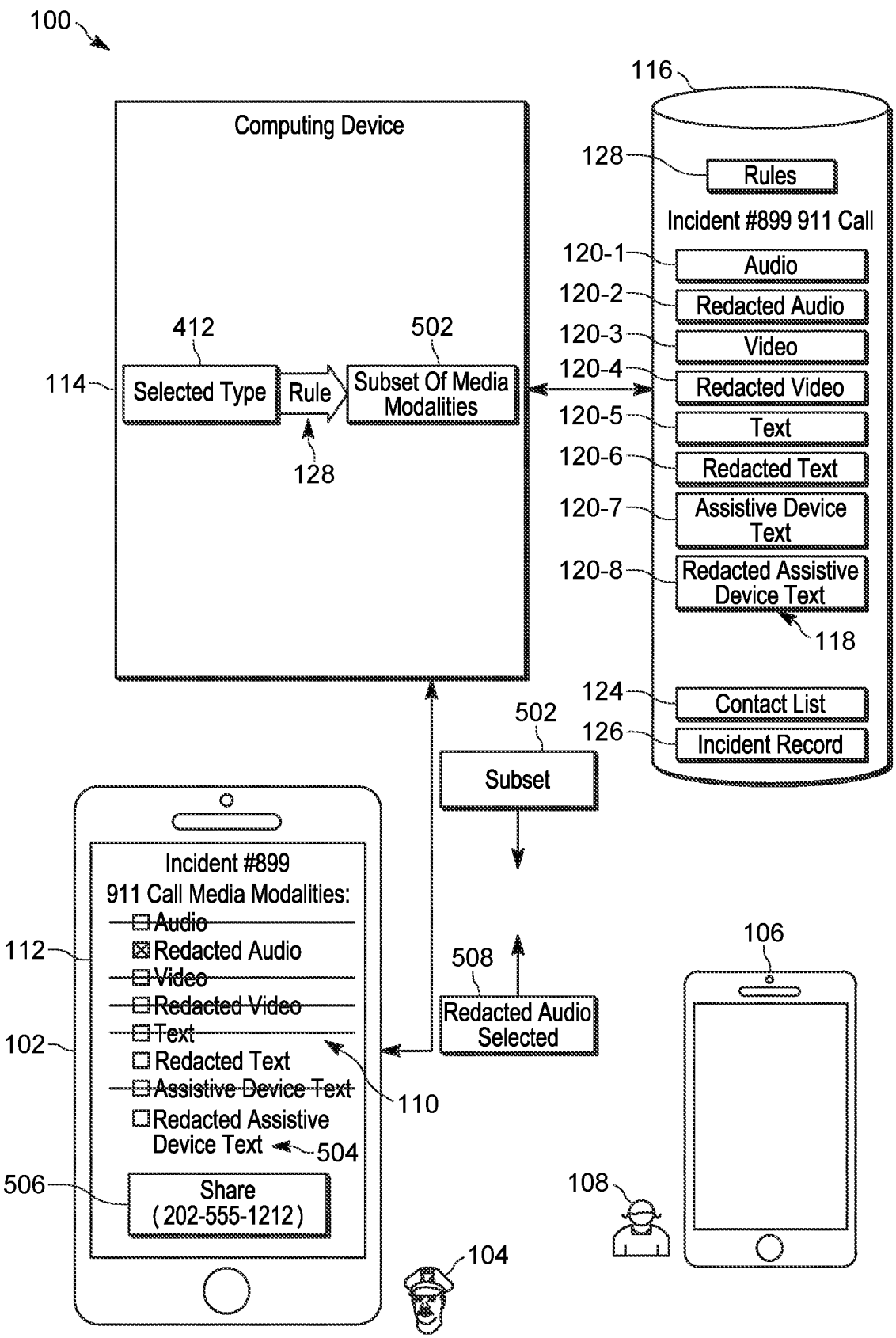
FIG. 5 depicts the system of FIG. 1, continuing to implement a method for sharing information of a selected media modality via communication devices, according to some examples.
Figure 6:
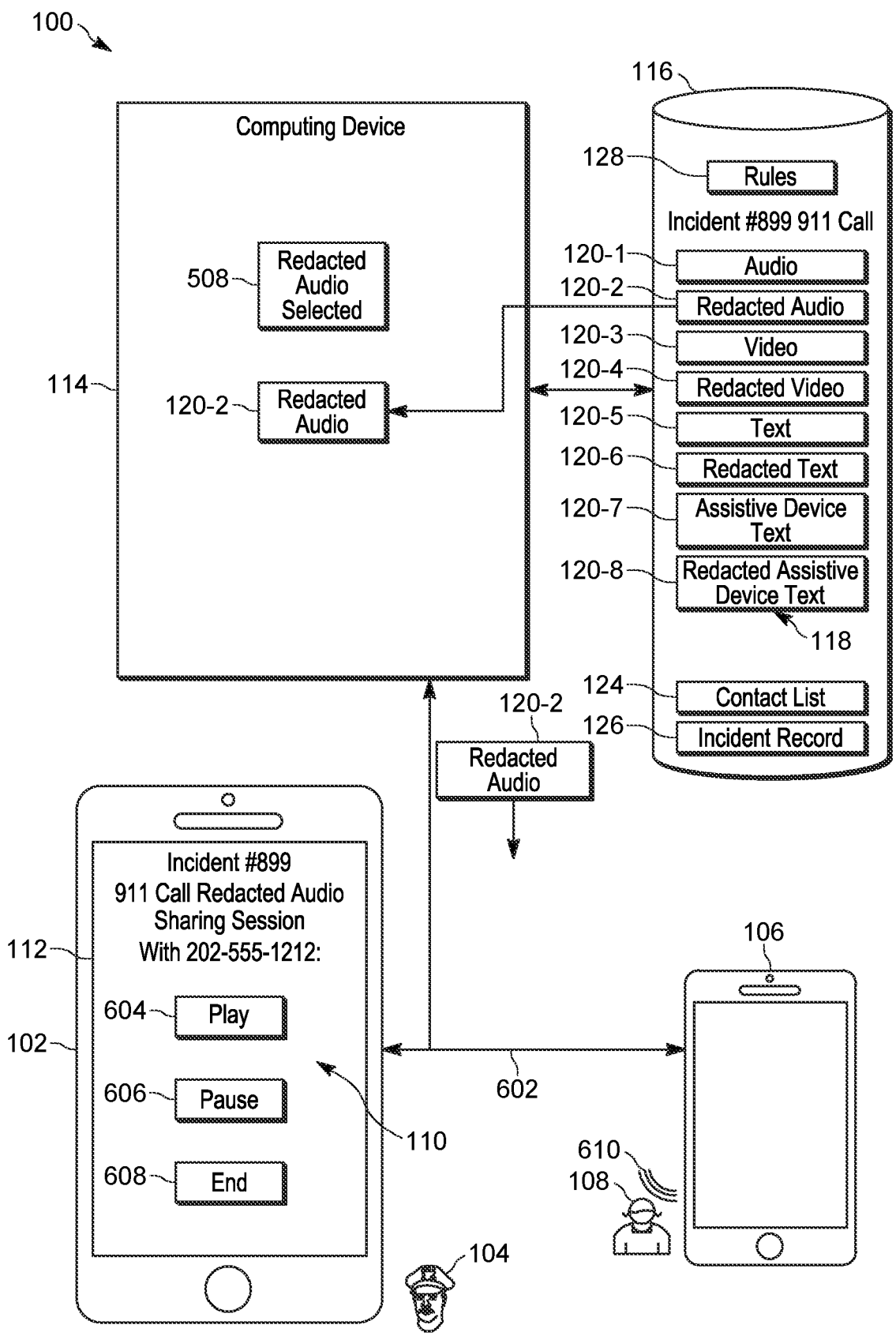
FIG. 6 depicts the system of FIG. 1, continuing to implement a method for sharing information of a selected media modality via communication devices, according to some examples.

Attention is next directed to FIG. 4, FIG. 5 and FIG. 6 which depict examples of aspects of the method 300. FIG. 4, FIG. 5 and FIG. 6 are substantially similar to FIG. 1, with like components having like numbers. In the examples provided in FIG. 4, FIG. 5 and FIG. 6 it is understood that the community member 108 is a community member with which a media modality 118 is to be shared, for example in conjunction with the first responder 104 investigating an incident with which the community member 108 is associated.

With attention first directed to FIG. 4, it is understood that FIG. 4 follows, in time, FIG. 1, for example after actuation of the electronic button 122.

In particular, in FIG. 4, the display screen 112 had been controlled (e.g. in conjunction with the incident application 110) to provide a list 402 of types of community members, which includes a "911 Caller", a "Witness (Associated With The 911 Caller)" (e.g. such as a neighbor, a relative, and the like), a "Witness (Not Associated With The 911 Caller)" (e.g. such as any witness who does know the 911 caller, and the like), a "Tipster" (e.g. an on-line tipster and/or a tipster who called a tip hotline), and a "Suspect". However, any suitable types of community member may be provided at the list 402, and may be retrieved from the computing device 114 and/or may be preprogrammed at the incident application 110. Furthermore, one of the types of community members may be selected (e.g. by way of the first responder operating the first responder communication device 102) via a selection box adjacent to the community member types. For example, as depicted, a "Witness (Not Associated With The 911 Caller)" is selected via an "X" in an adjacent selection box; for example, the community member 108 may be a type that is a "Witness (Not Associated With The 911 Caller)".

As depicted, the display screen 112 had been further controlled to provide a field 404 for entering a phone number, or other contact information (e.g. an email address, and the like) associated with the community member 108 and specifically the community member communication device 106.

Alternatively, the display screen 112 had been further controlled to provide electronic buttons 406, 408 which, when actuated, cause the first responder communication device 102 to respectively access the contact list 124 or the incident record 126 which may be used to select the phone number, or other contact information associated with the community member 108 and specifically the community member communication device 106 and/or may alternatively be used to select the type of the community member 108 (e.g. alternative to using the list 402).

It is understood that each type of community member in the list 402 may be associated with a respective rule 128 which defines respective subsets of the plurality of media modalities 118 that may be selected to share with a type.

For example, the display screen 112 had been further controlled to provide an electronic button 410, labelled "Next" which, when selected, causes the first responder communication device 102 to transmit, to the computing device 114, the selected type 412 of the community member 108 (and optionally the contact information).

With reference to FIG. 5, the computing device 114 receives the selected type 412 to determine (e.g. at the block 302 of the block 302) the type of the community member 108 associated with the incident (e.g. identified by the incident number "899"), and determines (e.g. at the block 304 of the block 302) a plurality of media modalities 118 of information associated with the incident.

In particular the computing device 114 may determine that all the depicted media modalities 118 are associated with the incident. However, the computing device 114 may apply a rule 128 associated with the selected type 412 to further determine a subset 502 of the media modalities 118 that may be shared with community members of the selected type 412. As depicted, the computing device 114 further transmits the subset 502 to the first responder communication device 102, which provides the subset 502 in a list 504 at the display screen 112 (e.g. in conjunction with the incident application 110). As depicted, the list 504 includes media modalities 118 available for selection (e.g. via adjacent selection boxes) that include the redacted audio 120-2, the redacted text 120-6 and the redacted assistive device text 120-8. As depicted, the list 504 further includes media modalities 118 that are not available for selection, for example via lines through such unavailable media modalities 118; for example, as depicted the audio 120-1, the video 120-3, the redacted video 120-4, the text 120-5 and the assistive device text 120-7 are not available for selection. As such, it is understood that the subset 502 may include indications (e.g. textual indications) of media modalities 118 that are available and not available for selection such that the list 504 may be generated by the first responder communication device 102.

As depicted, the media modality 118 of the redacted audio 120-2 has been selected from the list 504 (e.g. by way of an "X" in an adjacent selection box). As depicted, the display screen 112 had been further controlled to provide an electronic button 506, which, when actuated, causes the first responder communication device 102 to transmit an indication 508 of the selected media modality 118 to the computing device 114 (e.g. "Redacted Audio Selected"). For clarity, the electronic button 506 further shows an indication of the contact information of the community member communication device 106 (e.g. the phone number "202-555-1212").

Attention is next directed to FIG. 6 which depicts the computing device 114 selecting (e.g. at the block 306 of the method 300) a media modality 118 to share with the community member 108. For example, based on the indication 508, the computing device 114 selects and retrieves the redacted audio 120-2 from the memory 116. Furthermore, the computing device 114 causes sharing (e.g. at the block 308 of the method 300) of the redacted audio 120-2 by controlling the first responder communication device 102 to initiate a data sharing session 602 with the community member communication device 106. For example, as depicted, the first responder communication device 102 and the community member communication device 106 are in communication via a communication link therebetween; similarly, the computing device 114 is in communication with the community member communication device 106. It is understood that setting up the data sharing session 602 may include, but is not limited to, providing the community member communication device 106 with a link to access the redacted audio 120-2 and/or a link to a data sharing application provided via a browser application.

The first responder communication device 102 has been further controlled (e.g. in conjunction with the incident application 110) to provide electronic buttons 604, 606, 608 to respectively play the redacted audio 120-2, pause playing of the redacted audio 120-2, and end the data sharing session 602 (e.g. cause the communication link with the community member communication device 106 to be severed or ended). Hence, the first responder communication device 102 may control playing of the redacted audio 120-2 at the community member communication device 106, which may emit 610 the redacted audio 120-2 from a speaker.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, control data sharing sessions, and the like).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, at a computing device, a type of a community member associated with an incident, the incident further associated with a first responder;
   determining, at the computing device, a plurality of media modalities of information associated with the incident;
   selecting, at the computing device, from the plurality of media modalities of the information, a media modality of the information based on the type of the community member; and
   causing, at the computing device, sharing of the media modality of the information with the community member via one or more of a first responder communication device, associated with the first responder, and a community member communication device, associated with the community member.

2. The method of claim 1, further comprising determining the type of the community member based on input received at the first responder communication device.

3. The method of claim 1, wherein the plurality of media modalities of the information comprise two or more of:
   audio representing the information;
   redacted audio representing the information;
   video representing the information;
   redacted video representing the information;
   text representing the information;
   redacted text representing the information;
   assistive device text representing the information; and
   redacted assistive device text representing the information.

4. The method of claim 1, wherein selecting the media modality of the information, based on the type of the community member, is based on rules to limit sharing of personal identifiable information (PII) in the information to the community member.

5. The method of claim 1, further comprising:
   providing, via the computing device, at a display screen of the first responder communication device, a list of a subset of the plurality of media modalities of the information, the subset selected based on the type of the community member; and selecting the media modality of the information based on a selection of the media modality from the list, the selection occurring via input received at the first responder communication device.

6. The method claim 1, wherein the causing sharing of the media modality of the information with the community member comprises temporarily sharing the media modality of the information with the community member communication device.

7. The method of claim 1, wherein the sharing of the media modality of the information with the community member comprises establishing a data sharing session between the first responder communication device and the community member communication device.

8. The method of claim 1, wherein the sharing of the media modality of the information with the community member comprises providing the media modality of the information at the first responder communication device for viewing by the community member.

9. The method of claim 1, further comprising, providing, at the first responder communication device, an indication of one or more unselected media modalities of the information being unavailable for sharing with the community member.

10. The method of claim 1, further comprising selecting the community member from one or more of:
a contact list; and
an incident record associated with the incident.

11. A device comprising:
a communication unit; and
a controller configured to:
determine a type of a community member associated with an incident, the incident further associated with a first responder;
determine a plurality of media modalities of information associated with the incident;
select, from the plurality of media modalities of the information, a media modality of the information based on the type of the community member; and
cause, via the communication unit, sharing of the media modality of the information with the community member via one or more of a first responder communication device, associated with the first responder, and a community member communication device, associated with the community member.

12. The device of claim 11, wherein the controller is further configured to determine the type of the community member based on input received at the first responder communication device.

13. The device of claim 11, wherein the plurality of media modalities of the information comprise two or more of:
audio representing the information;
redacted audio representing the information;
video representing the information;
redacted video representing the information;
text representing the information;
redacted text representing the information;
assistive device text representing the information; and
redacted assistive device text representing the information.

14. The device of claim 11, wherein the controller is further configured to select the media modality of the information, based on the type of the community member, using rules to limit sharing of personal identifiable information (PII) in the information to the community member.

15. The device of claim 11, wherein the controller is further configured to:
provide at a display screen of the first responder communication device, a list of a subset of the plurality of media modalities of the information, the subset selected based on the type of the community member; and
select the media modality of the information based on a selection of the media modality from the list, the selection occurring via input received at the first responder communication device.

16. The device of claim 11, wherein the controller is further configured to cause sharing of the media modality of the information with the community member by temporarily sharing the media modality of the information with the community member communication device.

17. The device of claim 11, wherein the controller is further configured to cause sharing of the media modality of the information with the community member by establishing a data sharing session between the first responder communication device and the community member communication device.

18. The device of claim 11, wherein the controller is further configured to cause sharing of the media modality of the information with the community member by providing the media modality of the information at the first responder communication device for viewing by the community member.

19. The device of claim 11, wherein the controller is further configured to provide, at the first responder communication device, an indication of one or more unselected media modalities of the information being unavailable for sharing with the community member.

20. The device of claim 11, wherein the controller is further configured to select the community member from one or more of:
a contact list; and
an incident record associated with the incident.

* * * * *